US012781538B2

(12) United States Patent
Shetty et al.

(10) Patent No.: US 12,781,538 B2
(45) Date of Patent: Nov. 3, 2026

(54) EXIT DEVICE WITH SCISSOR BLOCKING

(71) Applicant: Schlage Lock Company LLC, Carmel, IN (US)

(72) Inventors: Manjunath Shetty, Udupi (IN); Suraj Kumbhar, Belagavi (IN); Suresha Chandrasekharareddy, Kgf (IN); Paul R. Arlinghaus, Fishers, IN (US); Eric Hoiland, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 149 days.

(21) Appl. No.: 18/595,772

(22) Filed: Mar. 5, 2024

(65) Prior Publication Data

US 2025/0283354 A1 Sep. 11, 2025

(51) Int. Cl.

*E05B 65/10* (2006.01)
*E05B 47/00* (2006.01)

(52) U.S. Cl.

CPC ........ *E05B 65/108* (2013.01); *E05B 47/0001* (2013.01); *E05B 65/1053* (2013.01)

(58) Field of Classification Search

CPC . E05B 65/108; E05B 47/0001; E05B 65/1053
See application file for complete search history.

(56) References Cited

U.S. PATENT DOCUMENTS

| | | | | |
|---|---|---|---|---|
| 2008/0012350 | A1* | 1/2008 | Condo | E05B 65/1093 292/92 |
| 2015/0184426 | A1* | 7/2015 | Arlinghaus | E05B 65/108 292/138 |
| 2018/0148955 | A1* | 5/2018 | Yalamati | E05B 65/1046 |
| 2019/0352937 | A1* | 11/2019 | McKibben | E05B 65/1053 |
| 2021/0148141 | A1* | 5/2021 | Yalamati | E05B 17/0041 |
| 2023/0323701 | A1* | 10/2023 | Liao | E05B 15/04 70/277 |
| 2023/0392411 | A1* | 12/2023 | Lehner, Jr. | E05B 65/10 |
| 2023/0407675 | A1* | 12/2023 | Liao | E05B 65/1073 |
| 2023/0407679 | A1* | 12/2023 | Komadina | E05C 3/162 |
| 2024/0141699 | A1* | 5/2024 | Blanchard | E05B 65/104 |
| 2024/0337134 | A1* | 10/2024 | Liao | E05B 65/1046 |
| 2024/0401373 | A1* | 12/2024 | Liao | E05B 65/1053 |
| 2025/0283354 | A1* | 9/2025 | Shetty | E05B 65/1053 |

* cited by examiner

*Primary Examiner* — Mark A Williams
(74) *Attorney, Agent, or Firm* — Taft Stettinius & Hollister LLP

(57) ABSTRACT

An exemplary exit device generally includes a pushbar, a scissor mechanism, a blocking member, and a driver. The pushbar is mounted for movement between a projected position and a depressed position. The scissor mechanism is connected between the pushbar and a latch mechanism, and depression of the pushbar causes an inward scissoring movement of the scissor mechanism and actuation of the latch mechanism. The blocking member is mounted for movement between a blocking position, in which the blocking member prevents the inward scissoring movement, and an unblocking position, in which the blocking member does not prevent the inward scissoring movement. The driver is operable to move the blocking member between the blocking position and the unblocking position.

20 Claims, 10 Drawing Sheets

EXIT DEVICE WITH SCISSOR BLOCKING

TECHNICAL FIELD

The present disclosure generally relates to exit devices, and more particularly but not exclusively relates to delayed egress exit devices.

BACKGROUND

Delayed egress systems are often installed to doors between a more-secure area and a less-secure area, and typically selectively permit egress from the more-secure area to the less-secure area. In contrast to standard free egress exit device systems, in which depression of the pushbar results in immediate actuation of the latch mechanism, delayed egress systems typically delay the actuation of the latch mechanism for a predetermined time period. Example facilities that may utilize such delayed egress systems include behavioral health centers, memory care centers, maternity wards, retail environments, and airports. Many conventional delayed egress systems utilize maglocks, which requires a separate unit to be installed to the door, increasing wiring and installation complexities. For these reasons among others, there remains a need for further improvements in this technological field.

SUMMARY

An exemplary exit device generally includes a pushbar, a scissor mechanism, a blocking member, and a driver. The pushbar is mounted for movement between a projected position and a depressed position. The scissor mechanism is connected between the pushbar and a latch mechanism, and depression of the pushbar causes an inward scissoring movement of the scissor mechanism and actuation of the latch mechanism. The blocking member is mounted for movement between a blocking position, in which the blocking member prevents the inward scissoring movement, and an unblocking position, in which the blocking member does not prevent the inward scissoring movement. The driver is operable to move the blocking member between the blocking position and the unblocking position. Further embodiments, forms, features, and aspects of the present application shall become apparent from the description and figures provided herewith.

DETAILED DESCRIPTION OF ILLUSTRATIVE EMBODIMENTS

Figure 1:
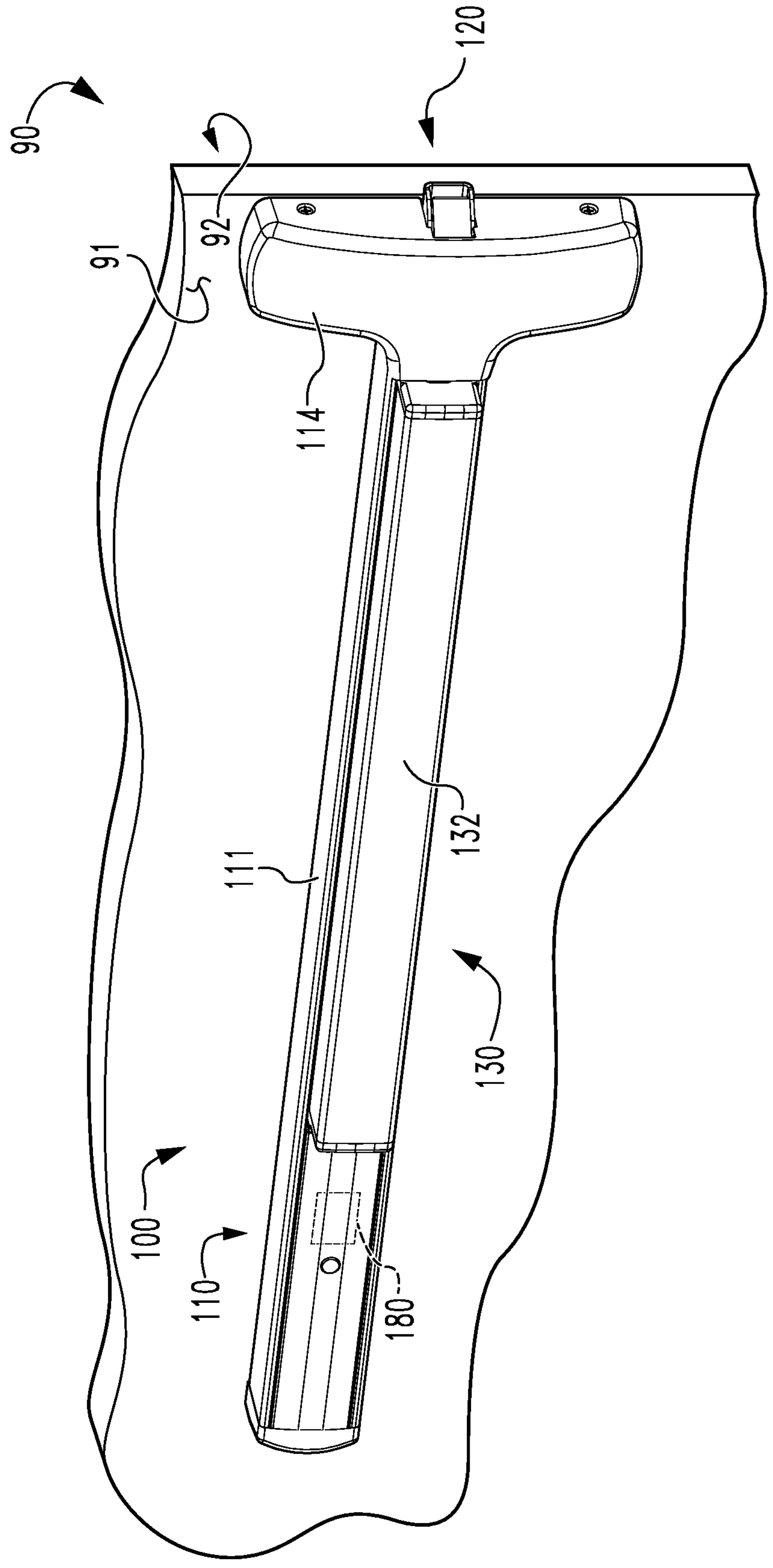
FIG. 1 is a perspective illustration of an exit device according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of “at least one of A, B, and C” can mean (A); (B); (C); (A and B); (B and C); (A and C); or (A, B, and C). Similarly, items listed in the form of “at least one of A, B, or C” can mean (A); (B); (C); (A and B); (B and C); (A and C); or (A, B, and C). Items listed in the form of “A, B, and/or C” can also mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a door 90 having installed thereto an exit device 100 according to certain embodiments, which in the illustrated form is provided as a delayed egress exit device. The door 90 has an egress side 91, which typically faces a more-secure area, and a non-egress side 92, which typically faces a less-secure area. As described herein, the delayed egress exit device 100 is operable to provide for delayed egress through the door 90 in response to a user-initiated exit request, and may further be configured to provide an alert during the delay period. While certain concepts are described herein with reference to a delayed egress embodiment of the exit device 100, it should be appreciated that the exit device 100 may be provided in another form.

Figure 2:
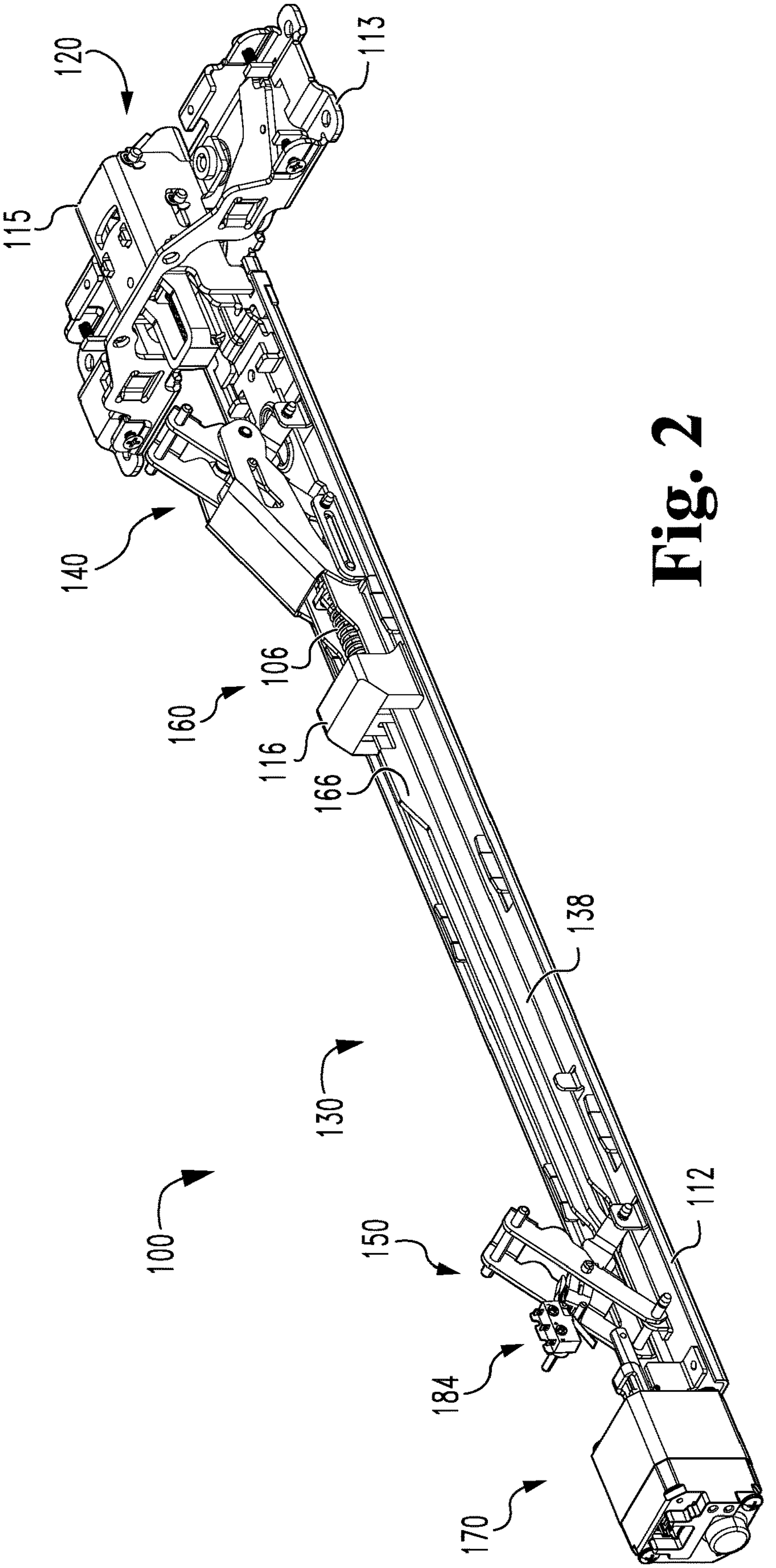
FIG. 2 is a perspective view of a portion of the exit device.

With additional reference to FIG. 2, the illustrated exit device 100 generally includes a mounting assembly 110, a latch mechanism 120, and a drive assembly 130 operable to selectively retract the latch mechanism 120. As described herein, the drive assembly 130 includes, among other elements and features, a proximal scissor mechanism 140 and a distal scissor mechanism 150. The exit device 100 further includes a blocking mechanism 160 operable to selectively prevent the drive assembly 130 from retracting the latch mechanism 120, a driver 170 operable to move the blocking mechanism 160 between a blocking state and an unblocking state, and a control assembly 180 configured to control operation of the driver 170.

The mounting assembly 110 is configured for mounting to the door 90, and generally includes a channel member 111, a base plate 112 mounted in the channel member 111, a header plate 113 positioned at a proximal end of the base plate 112, a header case 114 covering the header plate 113, and a mounting bracket 115 mounted to the header plate 113 within the header case 114. In the illustrated form, the mounting assembly 110 further includes a spring anchor 116, which is secured to the base plate 112 and provides an anchor point for a spring 106 as described herein.

Figure 3:
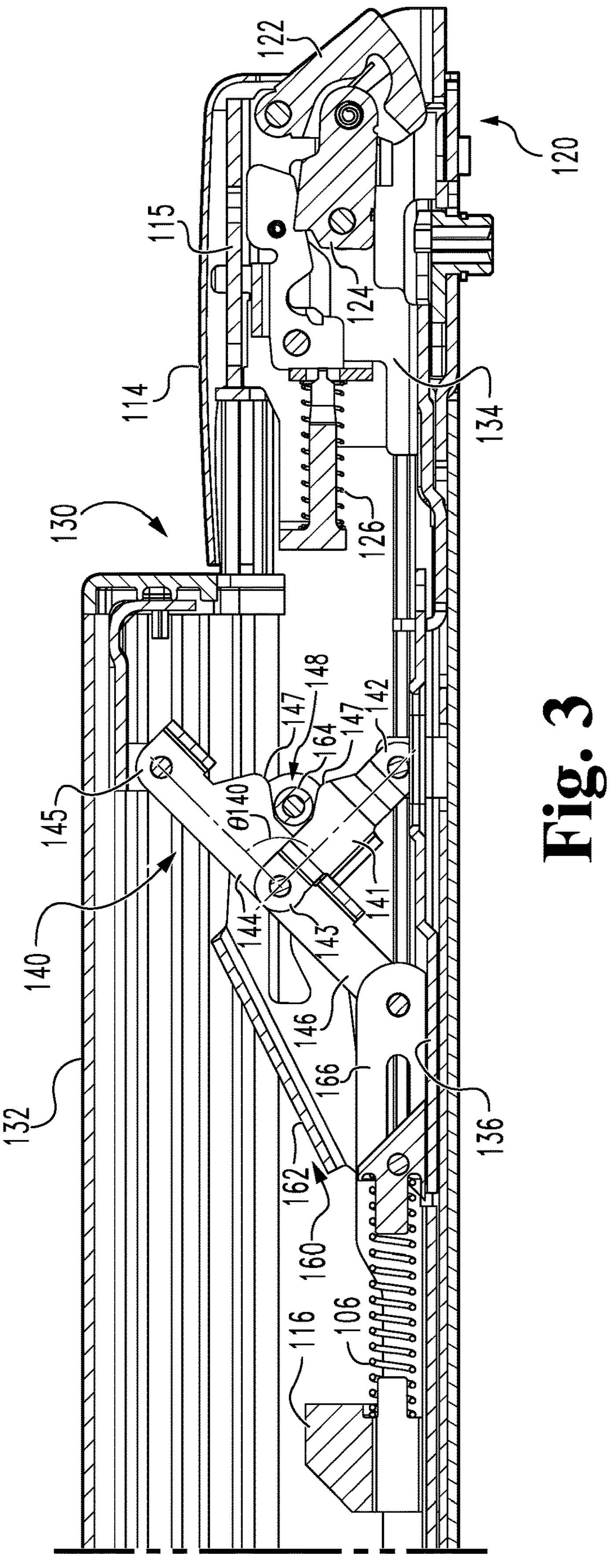
FIG. 3 is a cross-sectional illustration of a portion of the exit device, including a proximal scissor mechanism and a portion of a blocking mechanism.

With additional reference to FIG. 3, the latch mechanism 120 includes a latchbolt 122 having an extended position and a retracted position. In the illustrated form, the latchbolt 122 is pivotably mounted to the mounting bracket 115, is connected with the drive assembly 130 via a retractor 124, and is biased toward its extended position, for example by a spring 126. As described herein, actuation of the drive assembly 130 causes a corresponding actuation of the latch mechanism 120 for retraction of the latchbolt 122.

In the illustrated form, the exit device 100 is provided as a rim format exit device, in which the latch mechanism 120 is mounted within the header case 114. It is also contemplated that the concepts described herein may be utilized in combination with other forms of exit devices. As one example, the exit device 100 may be provided in the form of a vertical exit device, in which at least one latch mechanism is positioned remotely from (e.g., above or below) the header case 114. Additionally or alternatively, a latch mechanism may be provided in a mortise case configured for installation within the door 90. In such forms, the latch mechanism may nonetheless be selectively actuated by the drive assembly 130 in a manner analogous to that described herein.

The drive assembly 130 generally includes a pushbar 132 mounted for movement between an unactuated or projected position and an actuated or depressed position. As described herein, actuation of the drive assembly 130 by depressing the pushbar 132 causes a corresponding actuation of the latch mechanism 120 for retraction of the latchbolt 122. As noted above, the drive assembly 130 includes a pair of scissor mechanisms 140, 150. These scissor mechanisms 140, 150 support the pushbar 132 for movement between the projected position and the depressed position. The scissor mechanisms include a proximal scissor mechanism 140 that is positioned nearer the header case 114, and a distal scissor mechanism 150 that is positioned farther from the header case 114. The drive assembly 130 also includes a link plate 134 operable to retract the retractor 124, a latch link 136 operable to retract the link plate 134, and a scissor connector 138 coupled with the latch link 136. As described herein, the latch link 136 is engaged between the proximal scissor mechanism 140 and the link plate 134 such that depression of the pushbar 132 retracts the latch link 136 and the link plate 134, thereby actuating the latch mechanism 120 and retracting the latchbolt 122.

Figure 4:
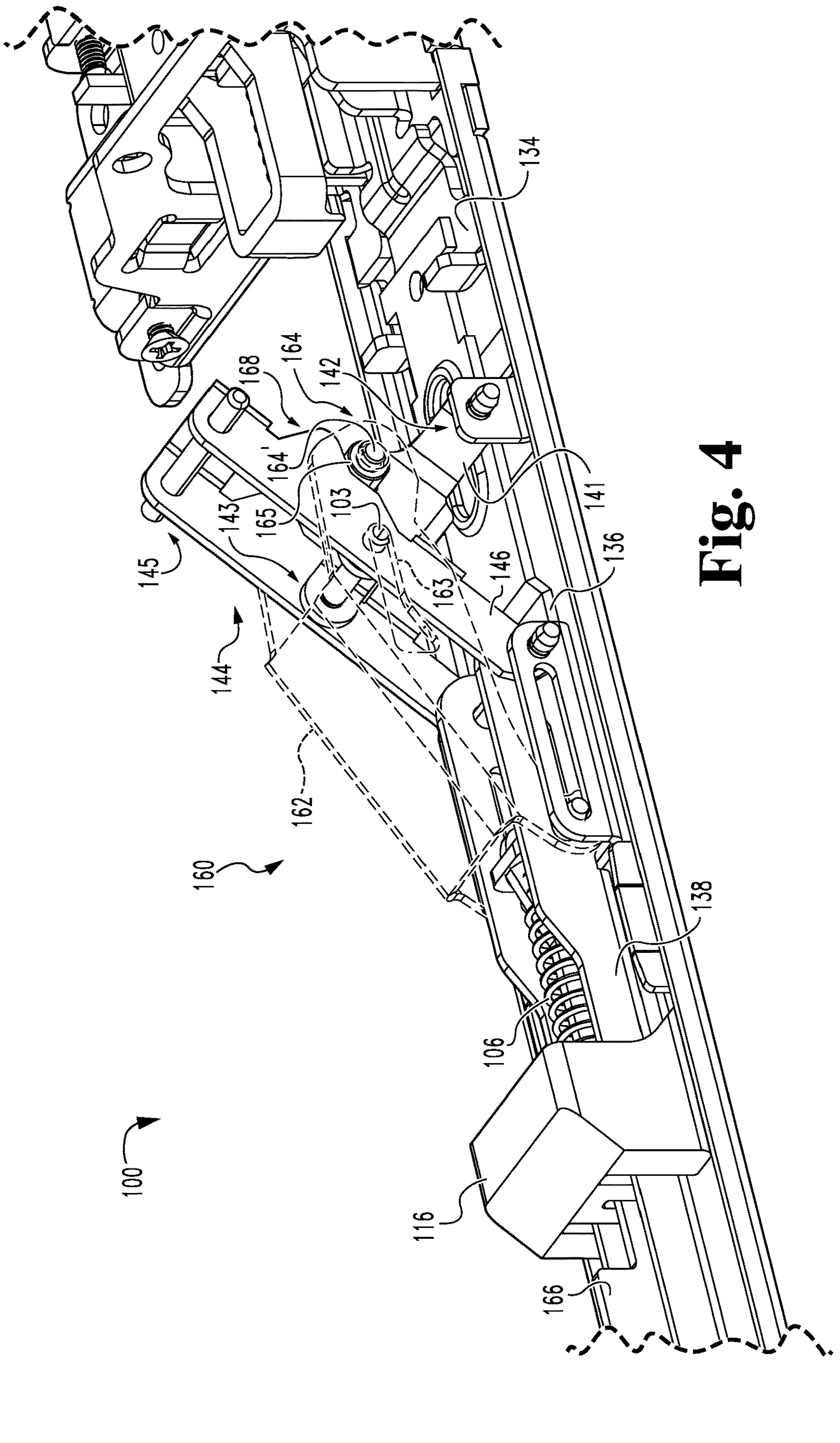
FIG. 4 is a perspective illustration of a portion of the exit device, including the proximal scissor mechanism and a portion of the blocking mechanism.

With additional reference to FIG. 4, the proximal scissor mechanism 140 generally includes a support arm 141 pivotably mounted to the mounting assembly 110, and a drive arm 144 pivotably connected between the pushbar 132 and the latch link 136. The support arm 141 includes a first end portion 142 pivotably connected to the mounting assembly 110, and an opposite second end portion 143 that is pivotably coupled with the drive arm 144. The drive arm 144 includes a first end portion 145 pivotably connected with the pushbar 132, and an opposite second end portion 146 that is pivotably connected with both the latch link 136 and the scissor connector 138. The support arm 141 meets the drive arm 144 at a scissor angle θ140 that varies during movement of the drive assembly 130. Each of the support arm 141 and the drive arm 144 includes a corresponding lobe 147, and the lobes 147 face generally toward one another such that a gap 148 is formed therebetween.

During unblocked movement of the scissor mechanism 140, depression of the pushbar 132 causes the drive arm first end portion 145 to move toward the base plate 112 (downward in FIG. 3), while distally driving the drive arm second end portion 146 away from the header case 114 for retraction of the latch link 136. This action also pivots the support arm 141, thereby causing the arms 141, 144 to scissor in a closing direction. Scissoring in the closing direction reduces the scissor angle θ140, and closes the gap 148 as the latch link 136 actuates the latch mechanism 120. As described herein, the blocking mechanism 160 is configured to selectively prevent the inward scissoring action in order to prevent depression of the pushbar 132 and retraction of the latchbolt 122.

Figure 5:
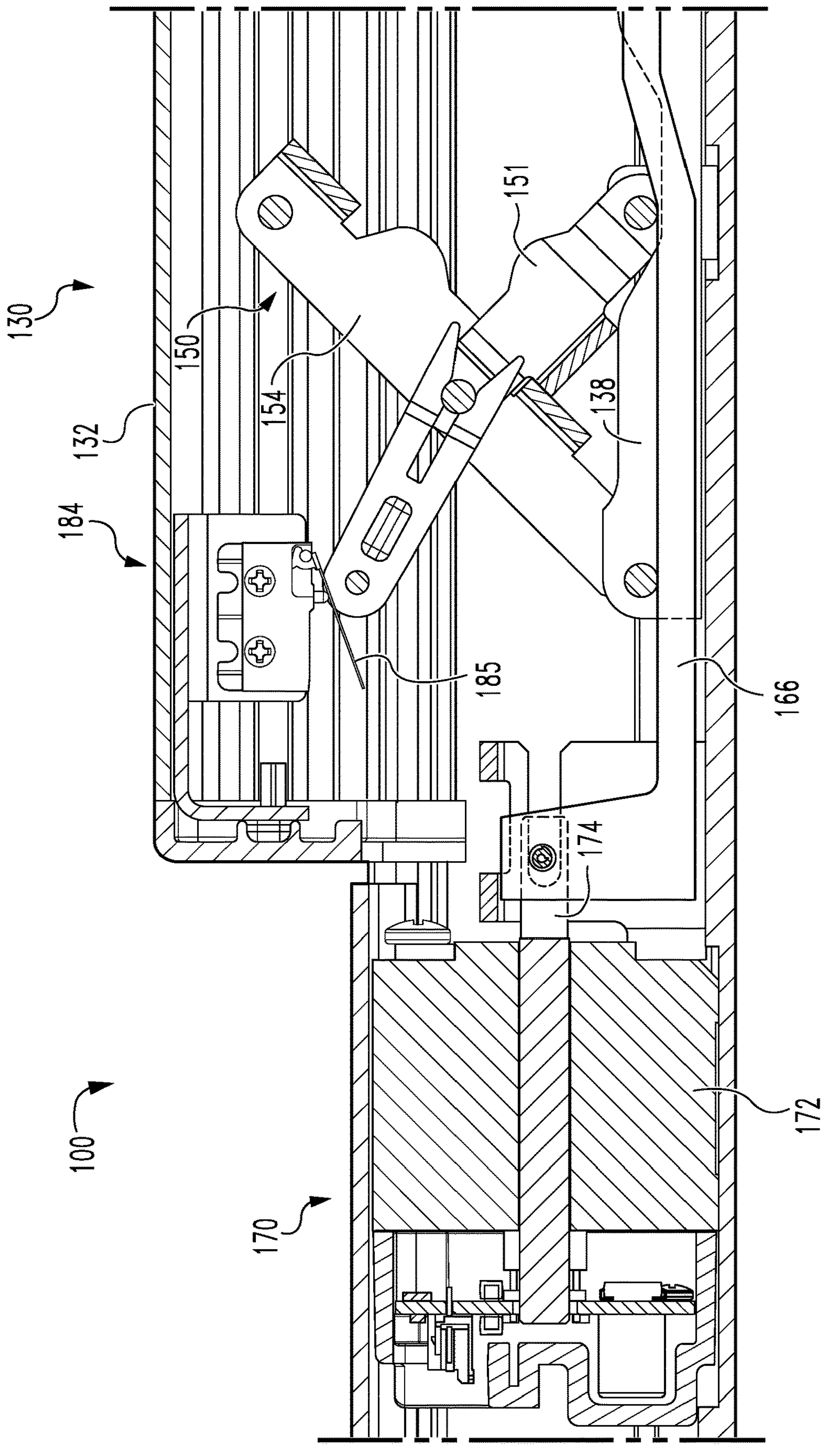
FIG. 5 is a cross-sectional illustration of a portion of the exit device, including a distal scissor mechanism and a request-to-exit sensor.
Figure 6:
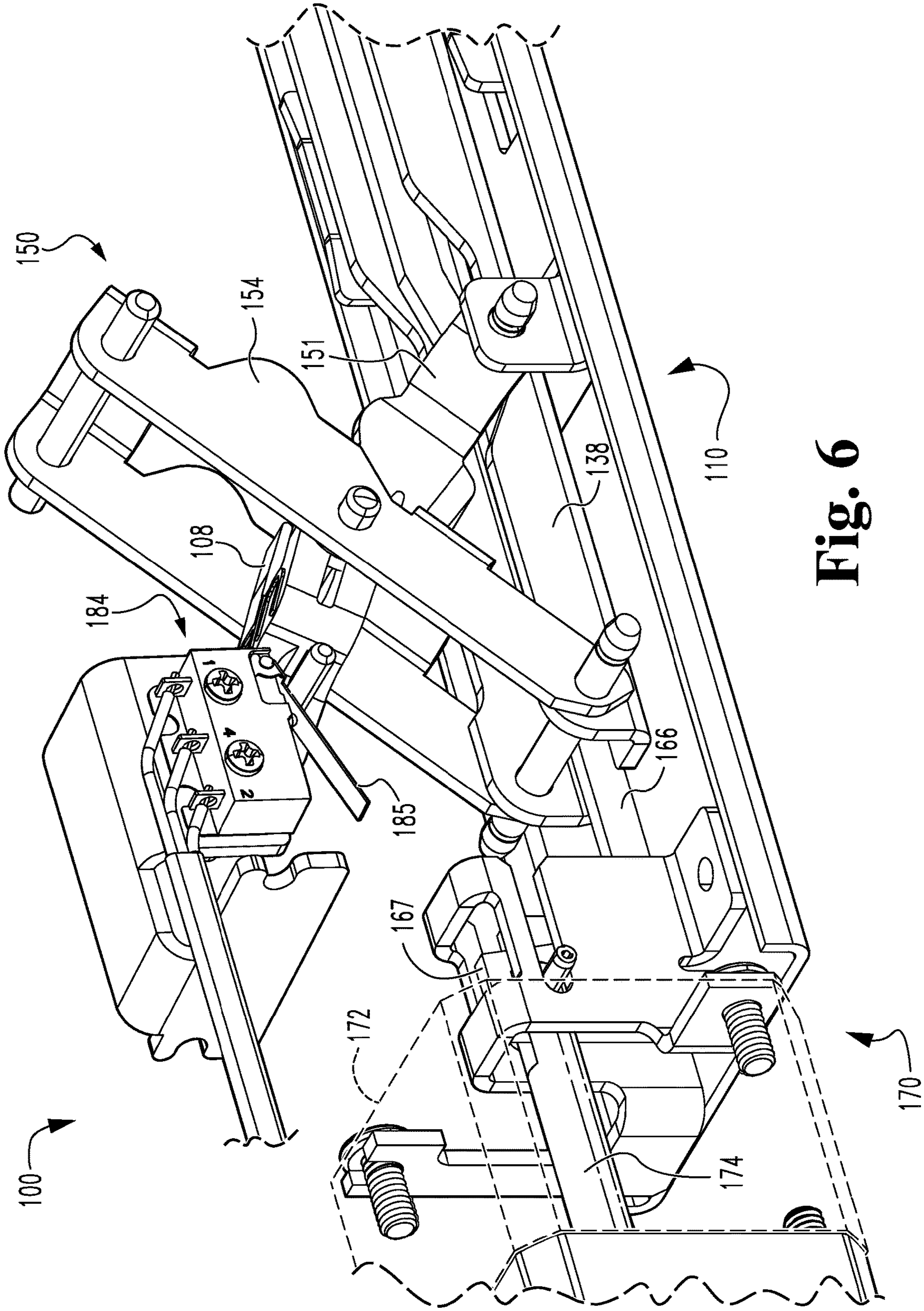
FIG. 6 is a perspective illustration of a portion of the exit device, including the distal scissor mechanism and the request-to-exit sensor.

With additional reference to FIGS. 5 and 6, the distal scissor mechanism 150 is similar to the proximal scissor mechanism 140, and similar reference characters are used to indicate similar elements and features. For example, the distal scissor mechanism 150 includes a support arm 151 pivotably mounted to the mounting assembly 110, and a drive arm 154 pivotably connected between the pushbar 132 and the scissor connector 138. The proximal end of the scissor connector 138 is coupled with the latch link 136 such that depression of the pushbar 132 causes the distal scissor mechanism 150 to aid in retraction of the latch link 136 by retracting the transmission link 158.

Mounted to the distal scissor mechanism 150 is an actuating arm 108 operable to engage a request-to-exit (REX) sensor 184 of the control assembly 180, which in the illustrated form is mounted to the underside of the pushbar 132 for movement with the pushbar 132. In the illustrated embodiment, the REX sensor 184 is provided in the form of a mechanical snap action switch that is actuated in response to depression of a spring arm 185. It is also contemplated that the REX sensor 184 may take another form, such as one involving a reed switch, a Hall effect sensor, an optical sensor, or another form of sensor. As described herein, the blocking mechanism 160 is operable to selectively prevent the pushbar 132 from being depressed by an amount sufficient to actuate the latch mechanism 120. However, even when the blocking mechanism 160 is in its blocking position, the pushbar 132 remains capable of slight movement. When an actuating force is applied by a user to the pushbar 132, this slight movement causes the REX sensor 184 to move downward by an amount sufficient to cause the REX sensor 184 to transmit a REX signal (e.g., by causing the actuating arm 108 to depress the spring arm 185). As described herein, the control assembly 180 may actuate the driver 170 to move the blocking mechanism 160 based at least in part upon receipt of the REX signal.

The blocking mechanism 160 generally includes a blocking bracket 162 having a blocking member 164 mounted thereto, and a driver link 166 connected between the blocking bracket 162 and the driver 170. As described herein, the blocking mechanism 160 has a blocking position (FIG. 8) and an unblocking position (FIG. 9), and may be biased toward the unblocking position. While other forms of biasing are contemplated, in the illustrated form, a blocking mechanism spring 106 is engaged between the spring anchor 116 and the driver link 166 such that the spring 106 biases the driver link 166 in the proximal direction to thereby bias the blocking mechanism 160 toward its unblocking position.

The blocking bracket 162 is coupled with the proximal end of the driver link 166, and may include a guide slot 163 that engages a guide pin 103 to aid in guiding movement of the blocking bracket 162 between its blocking position and its unblocking position. In the illustrated form, the blocking member 164 comprises a pin 164' that is operable to be received in the gap 148 to thereby block the scissoring action of the proximal scissor mechanism 140. In certain embodiments, the blocking member 164 may include a bushing 165 that discourages direct contact between the pin 164' and the scissor mechanism 140. In certain forms, the bushing 165 may be formed of a non-metallic (e.g., plastic or elastomeric) material to reduce sounds and/or vibrations resulting from contact between the blocking member 164 and the scissor mechanism 140. In certain forms, the bushing 165 may be rotatable relative to the bracket 162 such that the blocking member 164 is provided in the form of a roller 168.

The driver 170 is operable to move the blocking mechanism 160 between its blocking position and its unblocking position, and generally includes a body 172 and a reciprocating shaft 174 that is coupled with a distal end portion 167 of the driver link 166. In the illustrated form, the driver 170 is provided in the form of a linear motor. It is also contemplated that the driver 170 may be provided in another form, such as one including a solenoid or electromagnet.

As noted above the illustrated blocking mechanism 160 is biased toward its unblocking position, in which the blocking mechanism 160 does not prevent depression of the pushbar 132 and the resulting actuation of the latch mechanism 120. During normal use of the exit device 100, however, it is typically desirable to maintain the blocking mechanism 160 in its blocking position to prevent such free egress. Accordingly, the driver 170 may be normally powered during operation of the exit device 100 to thereby maintain the blocking mechanism 160 in the blocking position against the force of the spring 106. As described herein, the control assembly 180 may selectively cut power to the driver 170 to permit the spring 106 to drive the blocking mechanism 160 toward its unblocking position to permit egress.

Figure 7:
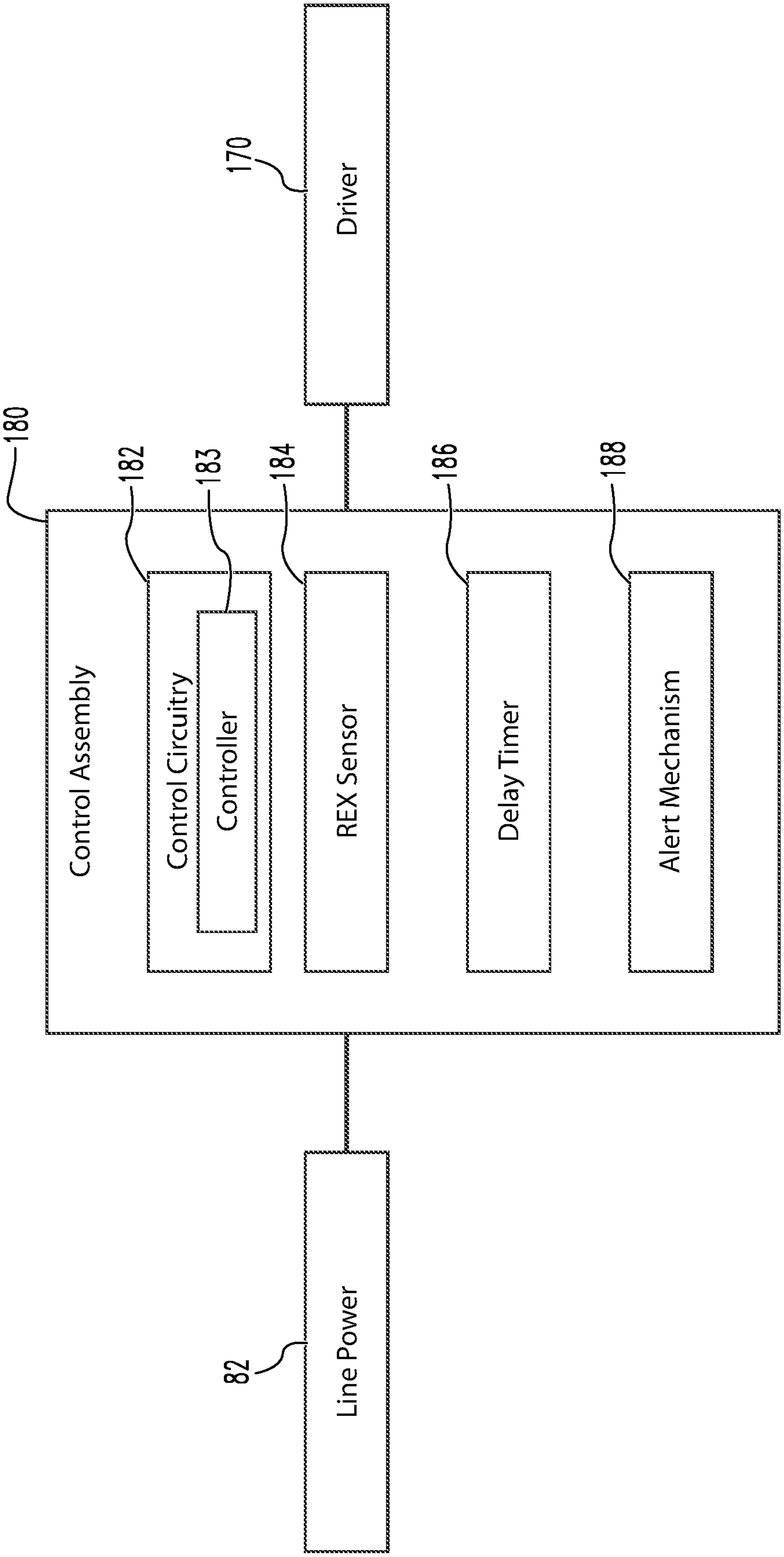
FIG. 7 is a schematic block diagram of the exit device.

With additional reference to FIG. 7, the control assembly 180 is in communication with the driver 170, and generally includes control circuitry 182, the REX sensor 184, and a delay timer 186, and may further include an alert mechanism 188. The control assembly 180 may be configured for connection to line power 82, and is configured to normally power the driver 170 to thereby selectively maintain the blocking mechanism 160 in its blocking position. When a user depresses the pushbar 132 and actuates the REX sensor 184, the control circuitry 182 initiates the delay timer 186. Upon expiration of the delay timer 186, the control circuitry 182 cuts power to the driver 170 to thereby cause the blocking mechanism 160 to move to its blocking position under the biasing force of the spring 106.

When the user depresses the pushbar 132, the control circuitry 182 may activate the alert mechanism 188. In certain embodiments, the alert mechanism 188 may be configured to provide a local alert, such as an audible and/or visual alert. For example, the alert mechanism 188 may include a buzzer and/or a flashing light, either of which may alert users in the area of the exit request. It is also contemplated that the alert mechanism 188 may be configured to provide a remote alert, for example by sending an alert signal to an access control system and/or a security station. In certain embodiments, activating the alert mechanism 188 may result in storing the time of the exit request in an audit trail.

Figure 11:
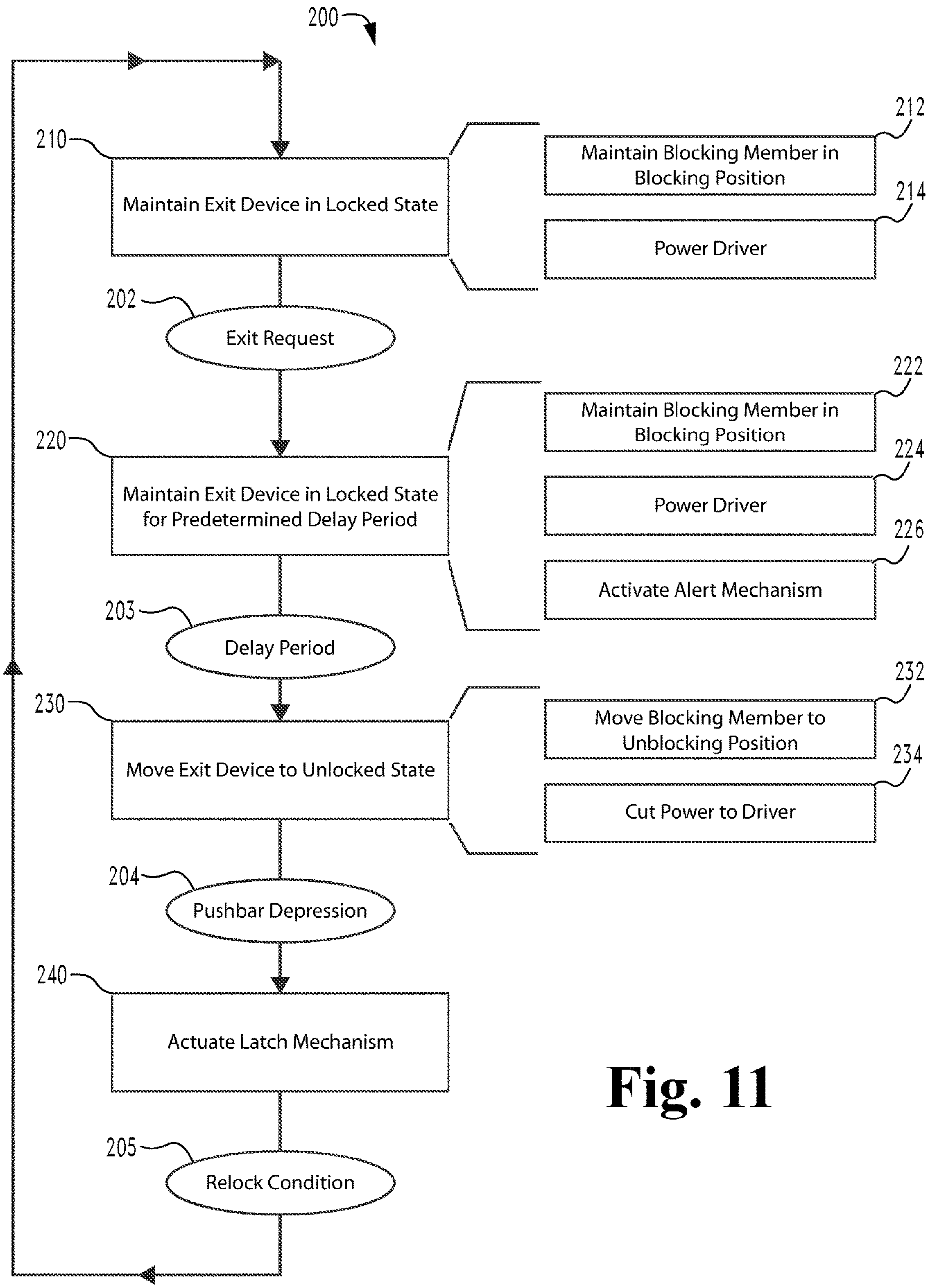
FIG. 11 is a schematic flow diagram of a process according to certain embodiments.
Figure 12:
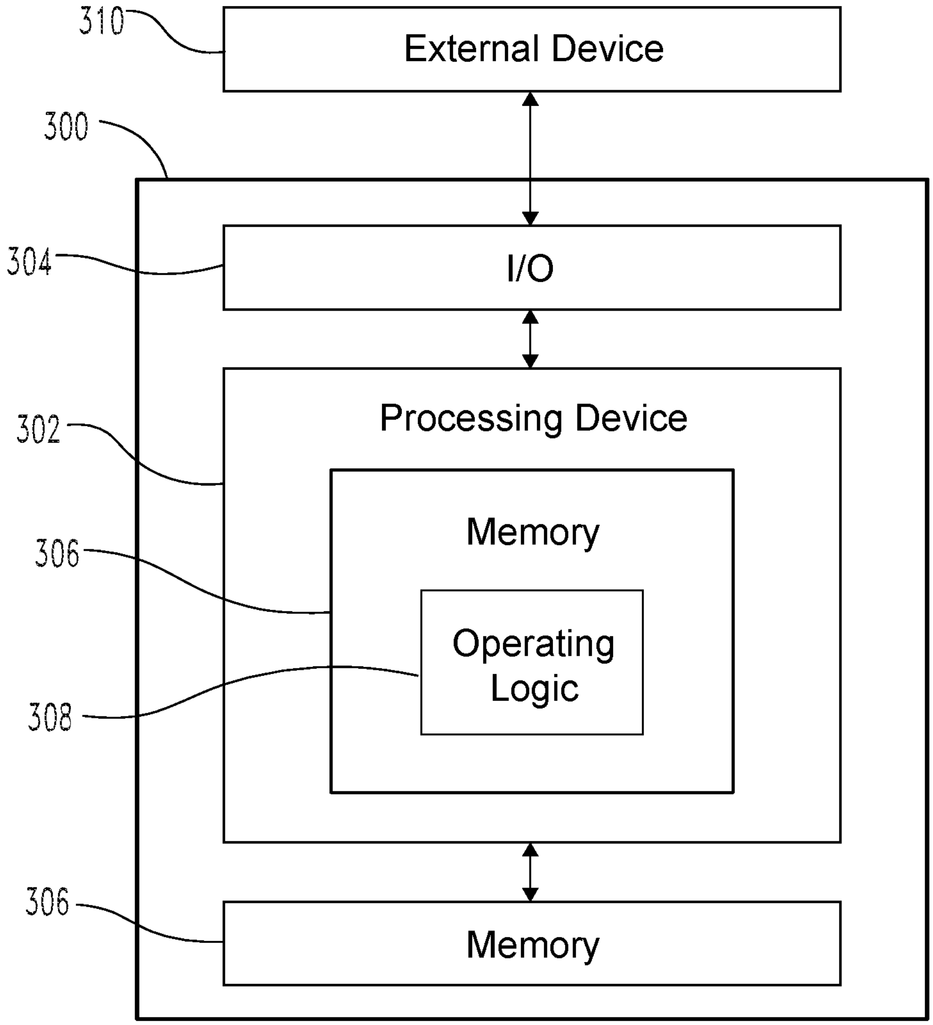
FIG. 12 is a schematic block diagram of a computing device according to certain embodiments.

In certain embodiments, the control circuitry 182 may comprise a controller 183, which may be embodied as a computing device as described herein with reference to FIG. 11. However, it should be appreciated that, in at least certain embodiments, the control circuitry 182 may not necessarily include a controller or other computing device, and may instead include traditional non-integrated circuits. Moreover, it should be appreciated that in certain embodiments, the control circuitry 182 may be considered to include the REX sensor 184, the delay timer 186, and/or the alert mechanism 188.

Figure 8:
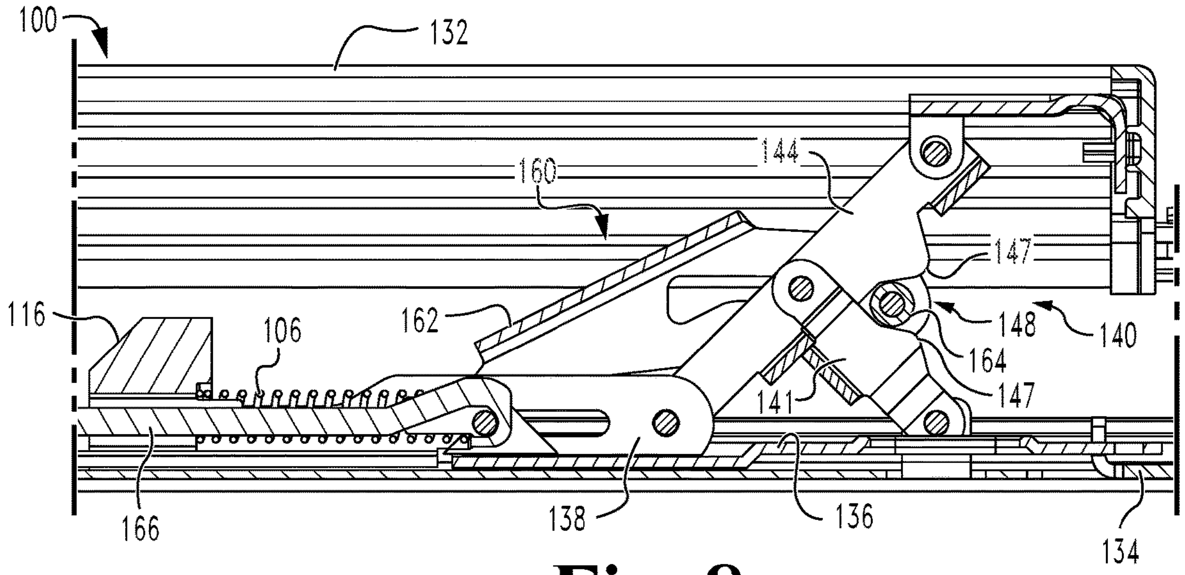
FIG. 8 is a cross-sectional illustration of a portion of the exit device with the exit device in a locked state.
Figure 9:
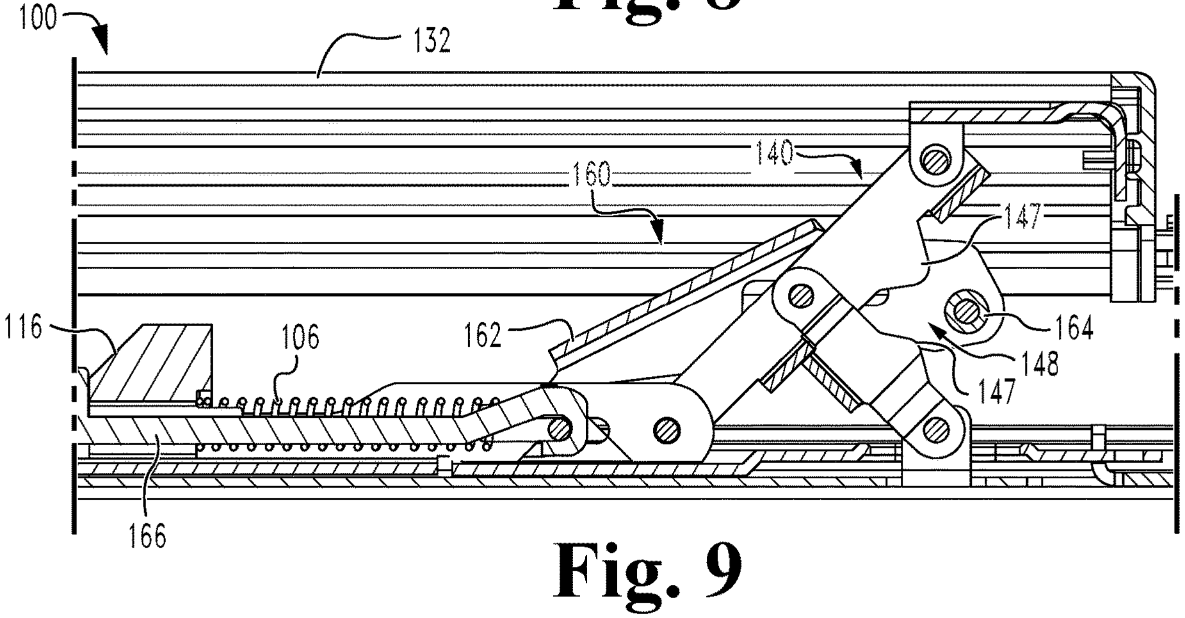
FIG. 9 is a cross-sectional illustration of a portion of the exit device with the exit device in an unlocked state.
Figure 10:
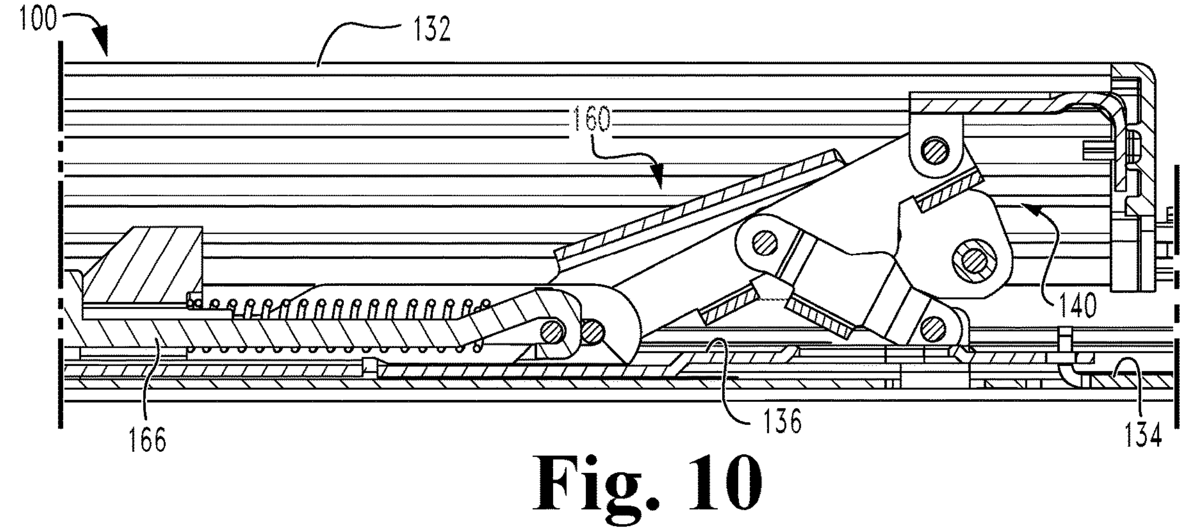
FIG. 10 is a cross-sectional illustration of a portion of the exit device with the exit device in an actuated state.

With additional reference to FIGS. 8-10, the illustrated exit device 100 has a delayed egress mode in which the exit device 100 is operable in a plurality of states, including a locked state (FIG. 8), an unlocked state (FIG. 9), and an actuated state (FIG. 10). As described herein, when operating in the delayed egress mode, the exit device 100 normally occupies the locked state, and selectively transitions to the unlocked state to permit actuation of the latch mechanism 120 by the drive assembly 130 for egress through the door 90.

With the exit device 100 operating in the delayed egress mode, the control assembly 180 by default maintains the blocking mechanism 160 in the blocking position to thereby retain the exit device 100 in its locked state (FIG. 8). In the illustrated form, maintaining the exit device 100 in its locked state involves powering the driver 170 to overcome the bias force of the spring 106 and maintain the blocking mechanism 160 in its blocking position. With the blocking mechanism 160 in its blocking position, the blocking member 164 is received in the gap 148 and captured between the lobes 147 to thereby prevent inward scissoring of the proximal scissor mechanism 140. As a result, the blocking mechanism 160 prevents the full depression of the pushbar 132 that would otherwise actuate the latch mechanism 120.

When a user desires to exit the secured area via the door 90, the user may exert a depressing force on the pushbar 132 to thereby provide the exit device 100 with an exit request that is registered by the REX sensor 184. In the illustrated form, the depressing force results in a slight movement of the pushbar 132 that activates the REX sensor 184 as described above. It is also contemplated that the user may register an exit request in another manner, such as by activating a remote switch, presenting a credential, or providing another indication of an intent and/or request to exit.

Upon receiving the REX signal from the REX sensor 184, the control circuitry 182 may initiate the delay timer 186. The delay timer 186 may, for example, be set to a time period between three seconds and ten seconds, such as a time period of about five seconds. During the delay period, the control circuitry 182 maintains the exit device 100 in the locked state, for example by maintaining power to the driver 170 such that the driver 170 continues to hold the blocking mechanism 160 in its blocking state. During the delay period, the control circuitry 182 may activate the alert mechanism 188 to provide an alert (e.g., an audible alert, a visual alert, and/or an electronic alert) regarding the exit request.

Upon expiration of the delay timer 186, the control circuitry 182 causes the exit device 100 to transition to the unlocked state (FIG. 9). For example, the control circuitry 182 may cut power to the driver 170 such that the spring 106 drives the blocking mechanism 160 toward its unblocking position, thereby removing the blocking member 164 from the gap 148 between the lobes 147. With the blocking mechanism 160 in its unblocking position, the blocking member 164 is removed from the gap 148 and no longer prevents the inward scissoring motion of the scissor mechanism 140. As a result, the user is able to depress the pushbar 132.

As the user depresses the pushbar 132, the exit device 100 transitions to the actuated state (FIG. 10). More particularly, the inward scissoring of the scissor mechanisms 140, 150 drives the scissor connector 138 and the latch link 136 in the distal direction, thereby actuating the latch mechanism 120 as described above. With the latch mechanism 120 actuated, the door 90 can be opened to permit egress from the secured area.

After causing the blocking mechanism 160 to move to the unblocking position, the control circuitry 182 may cause the blocking mechanism 160 to return to the blocking position in response to a return criterion, such as expiration of a second delay timer. For example, the control circuitry 182 may once again power the driver 170 to cause the driver 170 to overcome the bias force of the spring 106 to return the blocking mechanism 160 to its blocking position, thereby returning the exit device 100 to its locked state (FIG. 8).

With additional reference to FIG. 11, an exemplary process 200 that may be performed using the exit device 100 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 200 may be performed wholly by the control circuitry 182, a controller 183, the REX sensor 184, the delay timer 186, the alert mechanism 188, and/or the driver 170, or that the blocks may be distributed among one or more of the elements and/or additional devices or systems that are not specifically illustrated in FIGS. 1-10. Additionally, while the blocks are illustrated in a relatively serial fashion, it is to be understood that two or more of the blocks may be performed concurrently or in parallel with one another. Moreover, while the process 200 is described herein with specific reference to the exit device 100 illustrated in FIGS. 1-10, it should be appreciated that the process 200 may be performed with exit devices having additional and/or alternative features.

The process 200 generally involves delaying egress via a door having an exit device mounted thereon, the exit device including a blocking member, a scissor mechanism, and a pushbar. For example, the process 200 may involve delaying egress via the door 90, on which is mounted an exit device 100 that includes a blocking member 164, a scissor mechanism 150, and a pushbar 132.

The process 200 may include block 210, which generally involves selectively maintaining the exit device in a locked state. In certain embodiments, block 210 may include block 212, which generally involves maintaining the blocking member in a blocking position in which the blocking member prevents an inward scissoring movement of the scissor mechanism, thereby preventing movement of the pushbar from a projected position to a depressed position. For example, block 212 may involve maintaining the blocking member 164 in the blocking position (FIG. 8), in which the blocking member 164 prevents inward scissoring movement of the scissor mechanism 140. As described above, this prevention of the inward scissoring prevents movement of the pushbar 132 from its projected position (FIGS. 8 and 9) to its depressed position (FIG. 10). While other forms are contemplated, in the illustrated form, the blocking member 164 includes a pin 164' and a bushing 165, and the process 200 further includes the bushing 165 preventing direct contact between the scissor mechanism 140 and the pin 164'.

As noted above, in certain embodiments, the blocking member 164 may be biased toward its unblocking position, for example by a spring 106. In such forms, block 210 may include block 214, which generally involves powering a driver connected with the blocking member such that the driver overcomes the biasing and retains the blocking member in the blocking position. For example, block 210 may involve powering the driver 170 as described above such that the driver 170 overcomes the biasing of the spring 106 and retains the blocking member 164 in the blocking position (FIG. 8) against the biasing force of the spring 106.

Block 210 may be performed to maintain the exit device 100 in the locked state (FIG. 8) until an exit request 202 is received by the exit device 100. The exit request 202 may, for example, be generated by the REX sensor 184 in response to a user attempting to depress the pushbar 132 as described above. In response to the exit request 202, the process 200 may continue to block 220.

Block 220 may be performed in response to the exit request 202, and generally involves continuing to maintain the exit device in the locked state for a predetermined delay period. Block 220 may include block 222, which generally involves maintaining the blocking member 164 in the blocking position, for example by powering the driver 170 in block 224. In certain forms, the process 200 may involve performing block 220 for the duration of a delay period 203, which may begin by activating the delay timer 186 in response to the exit request 202. In certain forms, block 220 may include block 226, which generally involves activating an alert mechanism 188 to thereby provide a local and/or remote alert regarding the exit request 202.

In response to expiration of the delay period 203, the process 200 may continue to block 230, which generally involves moving the exit device to an unlocked state. In certain forms, block 230 may involve block 232, which generally involves moving the blocking member to the unblocking position, for example by cutting power to the driver in block 234. By way of illustration, blocks 232 and 234 may involve moving the blocking member 164 to its unblocking position (FIG. 9) in response to the control assembly 180 cutting power to the driver 170. As described above, moving the blocking member 164 to its unblocking position (FIG. 9) causes the blocking member 164 to permit the inward scissoring movement of the scissor mechanism 140, thereby permitting depression of the pushbar 132.

In certain forms, the process 200 may involve guiding movement of the blocking member 164 between its blocking position and its unblocking position. In the illustrated form, the blocking member 164 is mounted to a movable bracket 162 including a guide slot 163, and the process 200 involves guiding movement of the blocking member 164 via the guide slot 163 and a guide pin 103, which is received in the guide slot 163.

With the exit device 100 in its unlocked state, a user may depress the pushbar 132. In response to such pushbar depression 204, the process 200 may continue to block 240, which generally involves actuating a latch mechanism to thereby permit egress via the door. In certain embodiments, the latch mechanism actuated in block 240 may be a latch mechanism of a rim format exit device, such as the latch mechanism 120 illustrated in connection with the illustrative exit device 100. It is also contemplated that the latch mechanism actuated in block 240 may be a remote latch mechanism, such as a remote latch mechanism of a vertical format version of the exit device 100.

Following the unlocking of the exit device in block 230, a relock condition 205 may occur. In certain embodiments, the relock condition 205 may involve a relock timer. For example, the control assembly 180 may initiate a relock timer during block 230, and expiration of the relock timer may be interpreted as the relock condition 205. In response to the relock condition 205, the process 200 may return to block 210, in which the exit device 100 is once again maintained in the locked state in anticipation of the next exit request 202.

Referring now to FIG. 11, a simplified block diagram of at least one embodiment of a computing device 300 is shown. The illustrative computing device 300 depicts at least one embodiment of a controller that may be utilized in connection with the controller 183 illustrated in FIG. 7.

Depending on the particular embodiment, the computing device 300 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the driver 170, the REX sensor 184, the delay timer 186, and/or the alert mechanism 188. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As illustrated, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 11, it should be appreciated that a particular computing device 300 may include multiple processing devices 302, I/O devices 304, and/or memories 306 in other embodiments. Further, in some embodiments, more than one external device 310 may be in communication with the computing device 300.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device for an exit door, the exit device comprising:

a mounting assembly configured for mounting to the exit door;

a scissor mechanism movably mounted to the mounting assembly, wherein the scissor mechanism comprises a first arm and a second arm pivotably connected to the first arm, wherein a gap is formed between the first arm and the second arm such that the gap expands during an outward scissoring movement and contracts during an inward scissoring movement, and wherein the scissor mechanism is operably connected with a latch mechanism such that the inward scissoring movement causes a corresponding actuation of the latch mechanism;

a pushbar operably connected to the scissor mechanism such that depression of the pushbar causes the inward scissoring movement;

a blocking mechanism operable to selectively prevent the inward scissoring movement, wherein the blocking mechanism has a blocking position in which a blocking member is positioned in the gap and prevents the inward scissoring movement, and wherein the blocking mechanism has an unblocking position in which the blocking member does not prevent the inward scissoring movement; and a driver operable to move the blocking mechanism between the blocking position and the unblocking position.

2. The exit device of claim 1, wherein the blocking member comprises a pin and a bushing mounted to the pin.

3. The exit device of claim 2, wherein the bushing is formed of a non-metallic material.

4. The exit device of claim 2, wherein the bushing is rotatable.

5. The exit device of claim 1, further comprising a control assembly configured to cause the driver to selectively maintain the blocking mechanism in the blocking position, and to cause the driver to move the blocking mechanism to the unblocking position a predetermined amount of time following an exit request.

6. The exit device of claim 5, wherein the control assembly comprises a request-to-exit sensor configured to generate the exit request when actuated by a user.

7. The exit device of claim 1, wherein the scissor mechanism includes a pair of lobes, and wherein the gap is defined between the pair of lobes.

8. The exit device of claim 1, wherein the blocking mechanism further comprises a bracket connected between the driver and the blocking member;

wherein the bracket comprises a guide slot that receives a guide pin to thereby guide movement of the blocking mechanism.

9. The exit device of claim 1, wherein the blocking mechanism is biased toward the unblocking state.

10. A method of delaying egress via a door having an exit device mounted thereon, the exit device comprising a blocking member, a scissor mechanism, and a pushbar, wherein the scissor mechanism includes a first arm and a second arm pivotably connected to the first arm, the method comprising:

selectively maintaining the exit device in a locked state, comprising maintaining the blocking member in a blocking position in which the blocking member is positioned in a gap between the first arm and the second arm and thereby prevents an inward scissoring movement of the scissor mechanism, thereby preventing movement of the pushbar from a projected position to a depressed position;

in response to receiving an exit request, continuing to maintain the exit device in the locked state for a predetermined delay period;

in response to expiration of the delay period, transitioning the exit device to an unlocked state, comprising moving the blocking member to an unblocking position in which the blocking member permits the inward scissoring movement, thereby permitting depression of the pushbar; and in response to depression of the pushbar, actuating a latch mechanism to thereby permit egress via the door.

11. The method of claim 10, further comprising biasing the blocking member toward the unblocking position.

12. The method of claim 11, wherein selectively maintaining the exit device in a locked state further comprises powering a driver connected with the blocking member such that the driver overcomes the biasing and retains the blocking member in the blocking position.

13. The method of claim 10, wherein the blocking member comprises a pin and a bushing mounted to the pin; and wherein the method further comprises the bushing preventing direct contact between the scissor mechanism and the pin.

14. The method of claim 10, wherein the blocking member is mounted to a movable bracket; and wherein the method further comprises guiding movement of the blocking member via a guide slot formed in the movable bracket and a guide pin received in the guide slot.

15. An exit for an exit door, the exit device comprising:

a pushbar mounted for movement between a projected position and a depressed position;

a scissor mechanism connected between the pushbar and a latch mechanism, wherein the scissor mechanism comprises a first arm and a second arm pivotably connected with the first arm, and wherein depression of the pushbar causes an inward scissoring movement of the scissor mechanism and actuation of the latch mechanism;

a blocking member mounted for movement between a blocking position, in which the blocking member is interposed between the first arm and the second arm and thereby prevents the inward scissoring movement, and an unblocking position, in which the blocking member does not prevent the inward scissoring movement; and a driver operable to move the blocking member between the blocking position and the unblocking position.

16. The exit device of claim 15, further comprising a control assembly configured to cause the driver to selectively maintain the blocking mechanism in the blocking position, and to cause the driver to move the blocking mechanism to the unblocking position a predetermined amount of time following an exit request.

17. The exit device of claim 16, wherein the control assembly comprises a request-to-exit sensor configured to generate the exit request when actuated by a user.

18. The exit device of claim 15, wherein each of the first arm and the second arm comprises a corresponding and respective lobe;

wherein a gap is formed between the lobes when the scissor mechanism is in an unactuated condition;

wherein the blocking member is received in the gap when in the blocking position; and wherein the blocking member is removed from the gap when in the unblocking position.

19. The exit device of claim 15, wherein the blocking mechanism comprises a roller.

20. The exit device of claim 1, wherein the pushbar is operably connected with the latch mechanism via the scissor mechanism.

* * * * *